United States Patent [19]
Wickson

[11] 3,728,583
[45] Apr. 17, 1973

[54] ELECTRICAL FUSE SYSTEM
[75] Inventor: Arthur K. Wickson, Palos Verdes Estates, Calif.
[73] Assignee: The Garrett Corporation, Los Angeles, Calif.
[22] Filed: July 10, 1972
[21] Appl. No.: 270,392

[52] U.S. Cl. ............317/33 SC, 317/33 C, 317/40 A
[51] Int. Cl. ................................................H02h 3/08
[58] Field of Search .......................317/40 A, 33 SC, 317/33 C; 337/31, 33, 183

[56] References Cited

UNITED STATES PATENTS 3,684,923   8/1972   Keeler ..............................317/40 A Primary Examiner—James D. Trammell
Attorney—Orville R. Seidner

[57] ABSTRACT

An electrical fuse has a link with a notch or reduced section portion, adjacent which is a source of mechanical energy which is arranged to be energized from the charge on a capacitor by the closure of a switch, preferably a thyristor which is gated by a circuit means sensing the current flowing in the link.

9 Claims, 2 Drawing Figures

PATENTED APR 17 1973

3,728,583

ELECTRICAL FUSE SYSTEM

BACKGROUND OF THE INVENTION

The increasing use of computers has resulted in a demand for improved protection and stability of the "critical bus" that feeds the various components of the computer system. In many applications of computers the voltage of the critical bus must be maintained within close tolerances for both steady state and transient disturbances. For example, a transient change of voltage of ±20 percent for only 1 millisec may be sufficient to either shut down the computer or to cause errors in the processed data.

Transient disturbances of much greater magnitude than this are produced if there is a fault on any one of the parallel circuits feeding to or from the critical bus unless the faulted circuit is opened extremely quickly. The only available means of accomplishing this at present is by solid state switches. These switches operate to open a circuit in approximately 0.2 millisecs. This type of switch is expensive. Therefore a less expensive means of precisely and quickly opening a faulted circuit would have immediate and increasing applications.

The normal type of fuse is not suitable for protecting the critical bus against voltage disturbances because it opens the circuit too slowly and passes too much current to the fault. Typically, a 100 ampere fuse opens a circuit in about 20 milliseconds with a current of about 600 amperes, or in about 2 milliseconds with a current of about 1,200 amperes. During the period of fuse clearing, the voltage on the critical bus will drop much more than 20 percent.

The slow action of the fuse is caused by the time required to melt and vaporize the fuse conductor or link, plus the time required to extinguish the arc. The period of arc extinction is purposely extended to about the same time as the period of conductor melting in order to limit the peak voltage across the fuse (and feeder circuit). In other words, it is usually desired that the rate of current decay be equal to the rate of current increase. The current required to melt and vaporize the conductor is very high because the resistance of the fuse conductor must be low.

The present invention provides a circuit interrupter which has a much shorter period to open a circuit and much lower values of current passed through the circuit by applying some or all of the following principles:

1. The energy required to open the fuse is drawn from an isolated source instead of from the critical bus.
2. The instant of energy release is precisely controlled relative to the instantaneous value of current in the circuit.
3. The rate of energy application to the physical action of opening the circuit is increased.
4. The fuse link conductor is mechanically fractured instead of melted and vaporized. This greatly reduces the required energy to open the electrical circuit.
5. The period of the arc is not purposely extended. The fuse link is surrounded by an arc-quenching medium.
6. The time required to open the fuse is much shorter than the time required with conventional fuses for three reasons:
   a. the required energy is less,
   b. the required energy is applied to the fuse link much more quickly, and
   c. the period for arc extinction is minimized.

SUMMARY OF THE INVENTION

It is an object of the invention to provide a circuit interrupter having improved characteristics with respect to discrimination between normal electrical current and overload current. It is also an object to provide a fuse arrangement having improved characteristics with respect to high speed opening of an electrical circuit upon the occurrence of a specific value of current. In that regard it is obvious that the interrupter could also be made to open the circuit upon the occasion of a predetermined rate of change of current, if such were desired.

It is a general object to provide a fuse or circuit interrupter apparatus having an expendable or rupturable link fixedly supported by terminals arranged for connection in a line conductor, separative force means being disposed adjacent to at least a portion of the link to effect a fracture or rupture thereof by the application of exterior force substantially transverse to the longitudinal axis of the link, upon the occurrence of a predetermined magnitude or rate of change of current.

It is a specific object to provide a fuse as aforesaid having means for sensing the current in the link, and circuit means connected with the sensing means and the separative force means whereby the separative force means is energized upon the advent of predetermined signal information provided to the circuit means by the current sensing means.

It is further object to provide a fuse as aforesaid in which the separative force means comprises an electrical fusee, which is connected to a source of electrical energy discharge such as a capacitor and switch device in the circuit means, with the switch being arranged to close the circuit from the energy source, i.e. the capacitor, to the fusee by the action of the sensing means. In another embodiment the separative force means comprises an electromagnetic conductor means arranged to co-act electromagnetically with the fuse link by means of ferromagnetic attraction or induced current repulsion.

DESCRIPTION OF THE PREFERRED EMBODIMENTS

Figure 1:
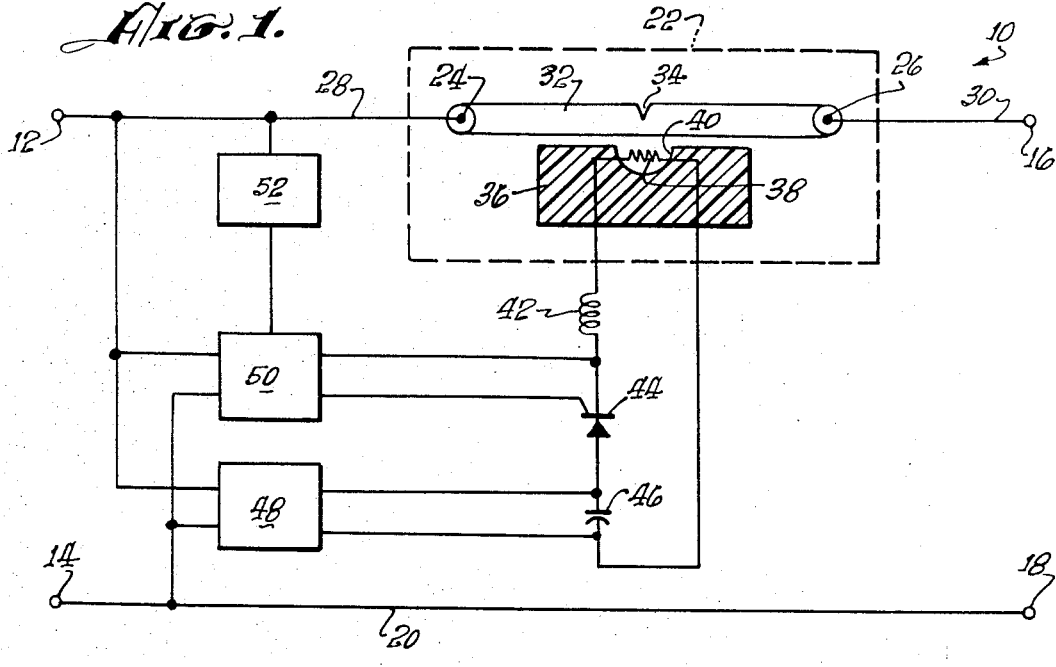
FIG. 1 is a schematic illustration of one preferred embodiment of the invention.

Referring to FIG. 1 there is shown a fuse system 10 arranged for connecting to the terminals 12 and 14 of a power source (not shown) which is to supply a load (not shown) connected to terminals 16 and 18 of the system 10. The conductor 20 connects the terminals 14 and 18.

The system 10 comprises a fuse housing or enclosure 22 with fuse terminals 24 and 26 fixedly disposed in spaced apart relation. Conductors 28 and 30 connect the respective terminals 12 and 24 and the terminals 26 and 16.

A rupturable conductor or fuse link 32 is affixed to and coupled between the terminals 24 and 26. The link 32 may be provided with a notch or reduced section 34 intermediate the terminals 24 and 26, if desired. The notch 34 introduces a weakened area in the link 32 for a purpose described hereinbelow. The material used in fuse link 32 is chosen on the basis of low mechanical strength and low resistivity.

Secured within the fuse housing 22 is an insulating block 36 which supports a resistance wire 38 within a concave depression 40 in the block 36 disposed adjacent to and immediately opposite the portion of the link 32 which has the notch 34. External to the fuse, connected in series with the wire coil 38 is an inductor 42, a switch which may be a thyristor 44 and a capacitor 46. The inductor 42 is an optional element in the functioning of the circuit 10. Its purpose is to improve the efficiency and extend the duration of the energy transfer from the capacitor 46 to the coil 38.

A capacitor charging means 48 is provided and coupled to the capacitor 46 for applying a charge thereto. As shown in FIG. 1 the charging means is connected to the conductors 20 and 28 as a source of power to charge the capacitor 46, but it will be appreciated that the charging means 48 may obtain its power from any convenient source.

The thyristor 44 is arranged for triggering by a triggering means 50 coupled to the gate and cathode electrodes of the thyristor. Conveniently, the triggering means may be coupled to the conductors 20 and 28 as a source of power. Both the charging and triggering means 48 and 50 are circuit arrangements well known to those skilled in the art and need not be disclosed in detail.

There is provided a sensing means 52 coupled with the conductor 28 to continuously sense the current in that conductor, hence to provide a measure of the current drawn by the load from the terminals 16 and 18. It is obvious, of course, that the means 52 could be coupled to the conductor 20 instead of the conductor 28, if so desired. The means 52 may be any one of several known devices. For example, the conductor 28 could have a shunt similar to that employed with ammeters, in which case the signal supplied to the triggering means 50 would be a voltage commensurate with the current in the shunt. If it is necessary or desired to have an uninterrupted conductor 28 between the terminals 12 and 24, the sensing means 52 could have the form of a turn of wire or a coil of a number of wire turns around the conductor 28 and subjected to the electromagnetic field thereof. In the latter case the sensing means 52 would probably comprise also a network of logic to account for the changes of current occurring in the conductor 28 and fed to the logic by the coil about the conductor, with an appropriate signal then being fed to the triggering means 50, all as well known to those skilled in the art.

The circuit 10 operates as follows, assuming that the system 10 has its terminals 12, 14 and 16, 18 coupled to an appropriate power source and load, respectively, and that the capacitor 46 is fully charged from the charging circuit 48. When a short circuit or any form of additional low impedance fault occurs across load terminals 16 and 18, the current through the link 32 increases rapidly. When the value of this current reaches a preset level, as determined by the triggering circuit means 50, the trigger voltage supplied by the means 50 to the thyristor 44 causes the latter to switch into conduction to discharge the capacitor 46 through the resistance wire 38.

The energy from the capacitor 46 is transferred to the wire 38 very rapidly and vaporizes the wire 38. The heat generated in the concave chamber 40 expands the air and produces a sudden explosive force on the link 32. This causes the link 32 to part at the weakest point 34 and thus to open the electrical circuit to the load. The two ends of the parted link 32 continue to separate and thus extinguish the arc that commenced at the initial parting at point 34. Thus, the action results in an opening of the circuit with a shortened time lapse of such span that voltage across the terminals 12 and 14 does not have a chance to drop more than a nominal amount. This is because (a) the actual disablement of the current-carrying link is effected by externally applied physical force, and (b) the energy to effect such disablement is a small fraction of that required in the usual case.

It is apparent, of course, that the rapid expansion of the air in the concavity 40 may be accomplished by other means than the vaporizing of the wire element 38. For example, a spark-gap may be utilized in place of the element 38, in which case the capacitor 46 would discharge with an extremely short duration spark to effect the rapid air expansion. Also, the wire element 38 may be enclosed in a small capsule surrounded by liquid or gas at normal or high pressure, or including a small amount of chemical explosive material, the purpose of which is to increase the force applied to the link 32 when the capacitor 46 discharges.

Another means by which the physical disablement of the link 32 might be enhanced would be to pre-stress the link 32, as by a spring or springs for example, so that when the partition of the link is initiated by the rapid expansion of the air in the concavity 40, the force stored in the spring or springs is added to the expansive force of the air to hasten the link rupture.

If it is desired to increase the rate of physical separation of link 32, it may be provided with more than one reduced section and the insulating block 36 provided with a corresponding number of concavities and vaporizable wire elements, along the lines of concavity 40 and element 38. Furthermore, since a current interrupter according to the invention need not be concerned with fusing of the link 32 in the usual manner upon the occurrence of an overload current, the insulating block 36 may be constructed of a good heat-conducting material in contact with the link 32 in order to minimize the mass of the link 32.

As shown in FIG. 1 the fusee 38 is disposed adjacent a surface portion of a substantially solid fuse link 32. Alternatively, the link 32 could be fabricated in the form of a hollow cylinder with the fusee coil disposed therewithin intermediate the cylinder ends. In such a case the energizing of the enclosed fusee would cause it to vaporize with explosive force within a confined space, along the order of the action of a firecracker, thus effecting an extremely rapid rupture of the cylinder wall around its circumference.

Figure 2:
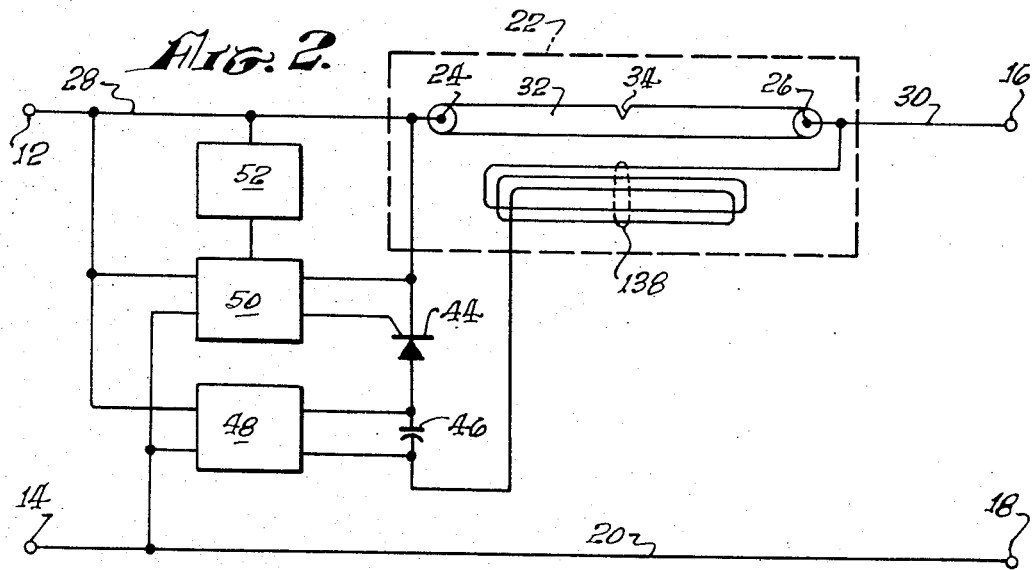
FIG. 2 is a similar illustration of another embodiment of the invention.

The embodiment of FIG. 2 depicts an alternate arrangement for effecting a rupture of the expendable link. Replacing the insulating block 36 and fusible coil of resistance wire 38 of FIG. 1 is an electromagnetic means comprising a coil of wire 138 which is coupled in series with the link 32, the switching thyristor 44 and the capacitor 46. All other elements of FIG. 2 are identical to corresponding elements of FIG. 1. An inductor such as that depicted at 42 in FIG. 1 is not particularly needful in the embodiment of FIG. 2 since the wire coil 138 may have incorporated in its form any desired inductance requirements.

The arrangement and disposition of the coil 138 vis-a-vis the link 32 is such that in operation of the circuit the gating of the thyristor 44 to discharge the capacitor 46 establishes an electromagnetic field about the link 32 which is opposed by the electromagnetic field established by the coil 138. The pulse of magnetic force thus established by these circuit elements forces the link 32 to move rapidly away from the coil 138 and become ruptured by the energy previously stored in the capacitor 46.

What I claim is:

1. An electrical current interrupter comprising:
   a. a rupturable link fixedly supported at spaced apart terminals for connection in a current carrying circuit;
   b. means for sensing the current in said current carrying circuit to provide signal information;
   c. separative force means adjacent to said link to effect a rapid separative rupture of said link by the application to surface portion of said link of a burst of force; and
   d. means coupled with said sensing means and said separative force means to effect an energization of said force means upon the advent of predetermined signal information from said sensing means.

2. The interrupter of claim 1 in which the signal information provided by said sensing means varies with the magnitude of the current in said circuit, said force means being energized upon the advent of a predetermined magnitude of said circuit current.

3. The interrupter of claim 2 in which said coupling means comprises a capacitor, the discharge of which energizes said force means.

4. The interrupter of claim 3 in which said coupling means further comprises switch means in series with said capacitor, and said sensing means is coupled to said switch means for actuation thereof.

5. The interrupter of claim 4 in which said switch means comprises a thyristor whose gate electrode is coupled to said sensing means.

6. The interrupter of claim 3 in which said force means comprises an electric fusee device.

7. The interrupter of claim 6 in which said rupturable link is a fuse link.

8. The interrupter of claim 1 in which said rupturable link has a reduced section adjacent said force means.

9. The interrupter of claim 3 in which said force means comprises electromagnetic conductor means adapted to react electromagnetically with said rupturable link.

* * * * *